Oct. 29, 1929.  H. LEDWINKA  1,733,688
MOTOR VEHICLE
Filed May 21, 1927  2 Sheets-Sheet 2
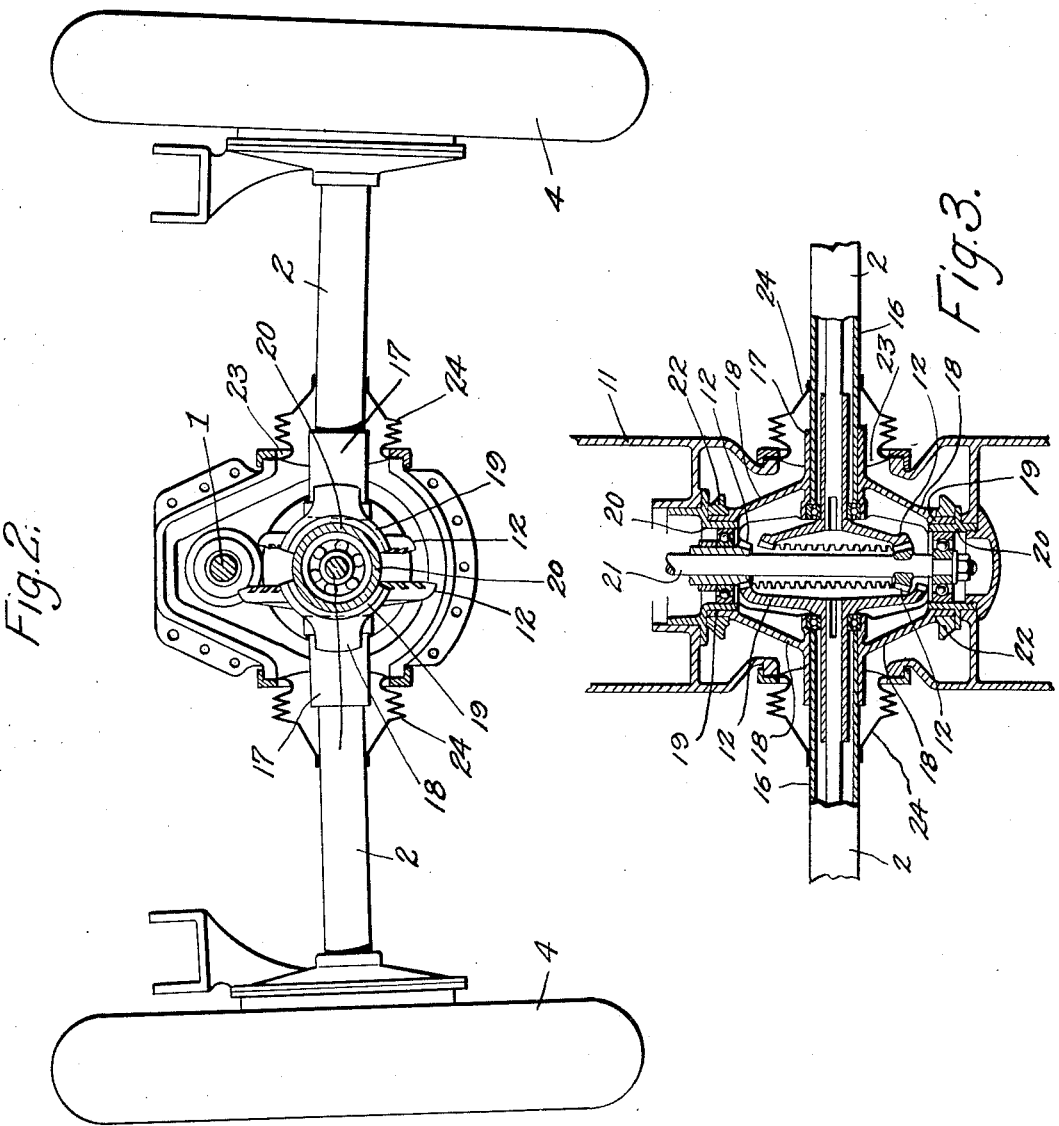

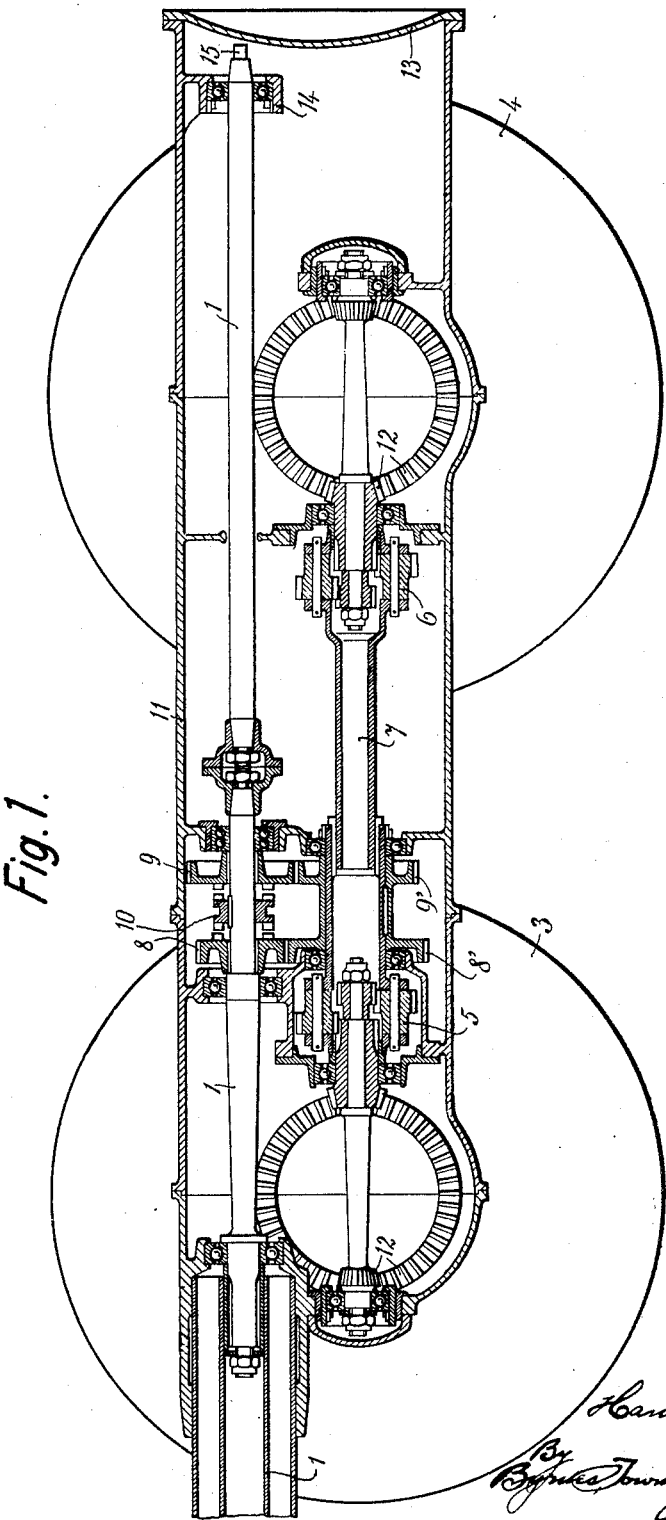

Patented Oct. 29, 1929

1,733,688

UNITED STATES PATENT OFFICE

HANS LEDWINKA, OF KOPRIVNICE, CZECHOSLOVAKIA

MOTOR VEHICLE

Application filed May 21, 1927, Serial No. 193,226, and in Czechoslovakia June 9, 1926.

The present invention relates to motor vehicles of the type in which two or more pairs of driven swivelling half axles are provided.

The principal object of the invention is to provide a particular means of driving the half axles without using flexible jointed couplings.

With this object in view, according to the invention both the main continuous shaft driven by the engine and the auxiliary shaft bearing the differential gears and driven by the main shaft, which auxiliary shaft is arranged between the two pairs of half axles, are constructed without flexible jointed couplings, and the said two shafts are mounted in a common rigid housing which preferably forms part of the frame of the vehicle.

A preferred constructional form according to the invention is illustrated in the accompanying drawings, in which:

Fig. 1 is a longitudinal section through a device constructed according to the invention, and Fig. 2 is a cross section of Fig. 1, showing the mounting of the half-axles.

Fig. 3 is a top plan view partly in section showing the connection of one pair of half-axles to the drive shaft.

Referring to the drawings, 1 is a continuous shaft driven from the engine of the vehicle, which shaft in the constructional example shown in the drawings extends up to the two rear pairs of driven half axles 2. Between these pairs of half axles carrying the driven running wheels 3, 4 a shaft 7 is mounted which is provided with differential gears 5, 6 each co-operating respectively with one of the pairs of driven half axles 2. The shaft 1 driven by the engine serves for driving the differential shaft 7. Neither of the shafts 1 and 7 is provided with any flexible jointed couplings in the neighbourhood of the driven pairs of wheels 3, 4 (see Fig. 1). The transmission gear which is driven from the shaft 1 and which drives the shaft 7 is preferably constructed as a change-speed gear 8, 8' and 9, 9', a claw coupling 10, which can be switched over, being provided between the toothed wheels 8 and 9.

The gear ratio of the transmission gear or of the change-speed gear, as the case may be, may be chosen as desired within wide limits so that the shaft 1 may have a fairly high rotational speed and may consequently be of relatively light construction. Apart from this, by constructing the shaft 1 in the form of a shaft without flexible joints economy in space is effected, so that considerable latitude in regard to the design of the differentials and the bevel gear 12 for the swivelling half-axles is rendered permissible.

The common housing 11 enclosing the gear and serving for supporting the two shafts consists of a rigid body which preferably forms part of a medial supporting body of the vehicle and is closed at its rear end by means of a cover 13. After removal of the said cover it is possible in the simplest manner to extend both the housing 11 and the rear end 15 of the shaft 1 (which is mounted in a bearing 14) by means of suitable constructional parts for the purpose of connecting on any desired number of further pairs of driven swivelling half axles without employing jointed couplings, similar members to those described being used for this purpose.

The construction of the swivelling half-axles may be of any known form. As illustrated, each half-axle consists of a tube 16 on the inner end of which a hub 17 is secured, having two diametrally directed arms 18. The free end 19 of each arm 18 is shaped as a part of a cylindrical body bearing on the outer cylindrical part 20 of the ball-bearing of the shaft 21, transmitting the movement from the differential 5 or 6 to the bevelled gear 12. The corresponding arms 18 of each pair of the half-axles are held together by a ring 22, the parts 20 and 22 forming a guiding and bearing space for the cylindrical ends 19 of the arms 18 when the half-axles are swivelling. In the housing 11 openings 23 are arranged to allow free movements of the half-axles. Said openings are closed by leather collars 24 tightened on the housing 11, on the one hand, and on the tube 16, on the other hand.

I claim:

1. In motor vehicles, a driving gear for two or more pairs of swivelling half-axles, comprising in combination: a continuous shaft without flexible jointed couplings; means for driving said shaft; a differential shaft without flexible jointed couplings, driven by said first-named shaft; pairs of half-axles driven by said differential shaft; and a common housing, within which both of said shafts are mounted, said differential shaft being mounted between said pairs of half-axles, substantially as described.

2. In motor vehicles, a driving gear for two or more pairs of swivelling half-axles, comprising in combination: a continuous shaft without flexible jointed couplings; means for driving said shaft; a differential shaft without flexible jointed couplings, driven by said first-named shaft; pairs of half-axles driven by said differential shaft; and a rigid housing within which both of said shafts are mounted and which forms part of the frame of the vehicle; said differential shaft being mounted between said pairs of half-axles, substantially as described.

HANS LEDWINKA.